US010519046B2

(12) United States Patent
Levy

(10) Patent No.: US 10,519,046 B2
(45) Date of Patent: Dec. 31, 2019

(54) HIGH FLOW-THROUGH GRAVITY PURIFICATION SYSTEM FOR WATER

(71) Applicant: Selecto, Inc., Suwanee, GA (US)

(72) Inventor: Ehud Levy, Suwanee, GA (US)

(73) Assignee: SELECTO, INC., Suwanee, GA (US)

( * ) Notice: Subject to any disclaimer, the term of this patent is extended or adjusted under 35 U.S.C. 154(b) by 248 days.

(21) Appl. No.: 13/838,507

(22) Filed: Mar. 15, 2013

(65) Prior Publication Data
US 2013/0270174 A1 Oct. 17, 2013

Related U.S. Application Data

(60) Provisional application No. 61/618,102, filed on Mar. 30, 2012.

(51) Int. Cl.
C02F 1/28 (2006.01)
B01J 20/28 (2006.01)
B01J 20/20 (2006.01)
C01B 32/30 (2017.01)

(52) U.S. Cl.
CPC ............ *C02F 1/281* (2013.01); *B01J 20/20* (2013.01); *B01J 20/28004* (2013.01); *B01J 20/28014* (2013.01); *B01J 20/28073* (2013.01); *B01J 20/28076* (2013.01); *C01B 32/30* (2017.08); *C02F 1/283* (2013.01); *C02F 2307/04* (2013.01)

(58) Field of Classification Search
CPC .. C02F 1/283; C02F 1/42; C02F 1/003; C02F 9/00; C02F 2201/006; C02F 1/441; B01D 2311/04; B01D 24/12; B01D 2311/2626; B01D 61/04; B01D 61/18; B01D 53/68; B01D 53/02; B01D 2201/4015; B01J 20/20

USPC ..... 210/282, 502.1, 266, 694, 688; 423/488, 423/241, 240 R
See application file for complete search history.

(56) References Cited

U.S. PATENT DOCUMENTS

| 4,624,937 | A | * | 11/1986 | Chou | 502/180 |
| 5,277,931 | A | * | 1/1994 | Maglio | B01J 47/018 427/212 |
| 5,338,458 | A | * | 8/1994 | Carrubba et al. | 210/668 |
| 5,449,655 | A | * | 9/1995 | Albers | B01J 37/0207 502/182 |
| 6,475,386 | B1 | * | 11/2002 | Carr et al. | 210/266 |

(Continued)

FOREIGN PATENT DOCUMENTS

| EP | 2627023 A2 | 11/2012 |
| WO | 9416998 A1 | 8/1994 |

(Continued)

OTHER PUBLICATIONS

Stephenson, Ralph L., and James B. Blackburn Jr. The Industrial Wastewater Systems Handbook. CRC Press, 1997.*

(Continued)

Primary Examiner — Krishnan S Menon
Assistant Examiner — Brad Gordon
(74) Attorney, Agent, or Firm — Dickinson Wright PLLC

(57) ABSTRACT

Disclosed is a gravity fed purification system having a purification media having a layer of low ash catalytic carbon having a nominal particle size range of about 20 mesh to about 50 mesh, wherein the purification system is able to produce a flow rate of about 1000 to about 1500 cc/min with a pressure head of about 300 to about 350 cc.

6 Claims, 7 Drawing Sheets

(56) References Cited

U.S. PATENT DOCUMENTS

| | | | |
|---|---|---|---|
| 6,524,477 B1* | 2/2003 | Hughes | C02F 1/003 210/282 |
| 7,229,552 B1* | 6/2007 | Levy | 210/266 |
| 2003/0038084 A1 | 2/2003 | Mitchell et al. | |
| 2003/0062312 A1* | 4/2003 | Cannon | B01J 20/20 210/694 |
| 2005/0247635 A1* | 11/2005 | Vo et al. | 210/685 |
| 2006/0000763 A1 | 1/2006 | Rinker et al. | |
| 2006/0207925 A1* | 9/2006 | Levy | 210/282 |
| 2008/0302713 A1* | 12/2008 | Patrick | B01D 65/08 210/234 |
| 2010/0219131 A1 | 9/2010 | Levy | |
| 2012/0055862 A1* | 3/2012 | Parekh | C02F 1/002 210/244 |
| 2013/0175228 A1* | 7/2013 | Utsch et al. | 210/767 |

FOREIGN PATENT DOCUMENTS

| | | | |
|---|---|---|---|
| WO | 2011090261 A2 | | 7/2011 |
| WO | WO 2011090261 A2 * | | 7/2011 |

OTHER PUBLICATIONS

Agam, G. Industrial Chemicals: Their Characteristics and Development. Newnes, 1994.*

Slater, J. C. "Atomic Radii in Crystals." J. Chem. Phys. 41, 3199 (1964). doi:10.1063/1.1725697.*

Li, Lei, Patricia A. Quinlivan, and Detlef R. U. Knappe. "Effects of Activated Carbon Surface Chemistry and Pore Structure on the Adsorption of Organic Contaminants from Aqueous Solution." Carbon 40, No. 12 (2002): 2085-2100. doi:10.1016/S0008-6223(02)00069-6.*

Cooney, David O. Adsorption Design for Wastewater Treatment. CRC Press, 1998.*

NSF Internationl, http://info.nsf.org/Certified/DWTU/.*

Calgon Carbon Corporation (Product Bulletin PB-1075-10/94).*

Calgon Carbon Corporation, TOG NDS 20×50 Material Safety Data Sheet. U.S. Department of Labor. 2011.*

International Trade Commission, Certain Activated Carbon from China, Investigation No. 731-TA-1103, I-6 (Publication 3913, 2007).*

Desotech Activated Carbon, Activated carbon size, n.d. (available at http://www.desotec.com/activated-carbon/types-of-activated-carbon/properties/size/).*

USTIC, Certain Activated Carbon from China, p. I-5 (2007) (available at https://www.usitc.gov/publications/701_731/pub3913.pdf).*

U.S. International Trade Commission, Certain Activated Carbon from China, Investigation No. 731-TA-1103, I-6 (Publication 3913, 2007). (Year: 2007).*

EP13160820, European Search Report, dated Jul. 24, 2013, 3 pages.

* cited by examiner

HIGH FLOW-THROUGH GRAVITY PURIFICATION SYSTEM FOR WATER This application claims benefit of the filing date of U.S. Provisional Application Ser. No. 61/618,102, filed Mar. 30, 2012, the entire contents of which are incorporated herein by reference.

BACKGROUND

1. Field

Disclosed herein is a purification material in the form of a flat layer, that provides a high rate of water flow through the material, requires minimal head of water to effect a flow rate and purification rate acceptable to consumers, and provides good removal of contaminants from water, rendering it purified and potable.

2. Description of Related Art

Certain purification systems for drinking water that rely on a pressure head of the water above the purification material are known, such as the BRITA pitcher filtration systems and the like. These systems are typically used in households to remove the tastes and/or odors associated with chlorinated tap water. However, these systems generally provide a purification material having a relatively low rate of flow through the purification material. Partly this may be by design, because the purification material does not provide sufficiently fast purification kinetics, so that contaminants are only slowly removed from the water, requiring a longer residence time in the purification material. Another reason for the low flow rate is the structure of the purification material itself. Purification materials that are insufficiently porous or that have such high pressure drops across the material that only lower rates of flow-through are possible so that the system may retain water for periods of time in excess of that required for purification.

Moreover, the media used in existing filters causes problems at the beginning and end of the useful lifetimes of the system. At the beginning of use of a fresh purification material, carbon fines will be released into the water, often requiring 5-10 liters of flow through before this release ceases. In addition, some of the media used in these purification systems can swell over time, particularly as organic contaminants are sorbed from the water, which can slow the flow rate even more. For example, certain coconut shell carbons used as purification media can, over time, slow down their flow rates to 1000 cc over 30 minutes, a flow rate that is unacceptable to consumers. Depending upon the level of dissolved organic contaminants in the water, this swelling can drastically reduce the effective lifetime of the system.

Additionally, the form factor of these systems is generally in the form of a tube, sometimes of several inches in length. Because of this, the filters often extend for some distance into the reservoir of purified water that results from use of the purification system, which can result in contact between purified water and water that has not yet been purified.

Accordingly, there remains a need in the art for a purification material that is sufficiently porous and that has sufficiently low pressure drop across the purification material to allow for rapid flow-through of water being purified, thereby decreasing the pressure head necessary to use the system, that has sufficiently fast purification kinetics to adequately purify the water flowing through the material in the lower residence time that results from the rapid flow-through, that does not have prolonged release of carbon fines during initial periods of use, that does not restrict flow from swelling with organic contaminants, and that reduces the opportunity for purified water to come into contact with unpurified water.

SUMMARY

In one embodiment is disclosed a gravity fed purification system comprising:

a purification media comprising a layer of low ash catalytic carbon having a nominal particle size range of about 20 mesh to about 50 mesh, more particularly about 28 mesh to about 50 mesh;

wherein the purification system is able to produce a flow rate of about 1000 to about 1500 cc/min with a pressure head of about 300 to about 350 cc. The dimensions of the layer are somewhat variable, but desirably the layer contains 10-15 g of purification media. Desirably, the layer is in the form of a disc having a diameter of about 2 to about 3 inches, more particularly about 2.5 inch and a thickness of about 0.4 to 0.7 inch, more particularly about 0.5 inch.

Desirably, this system is capable of reducing chorine to levels acceptable to consumers with a capacity of 30 gallons of water per gram of purification material used.

BRIEF DESCRIPTION OF DRAWINGS

FIG. 2 is a series of graphs showing the pore size and volume characteristics of a carbon purification media used in an embodiment of the purification system disclosed herein, obtained by mercury porosimetry.

DETAILED DESCRIPTION OF SPECIFIC EMBODIMENTS

Figure 1:
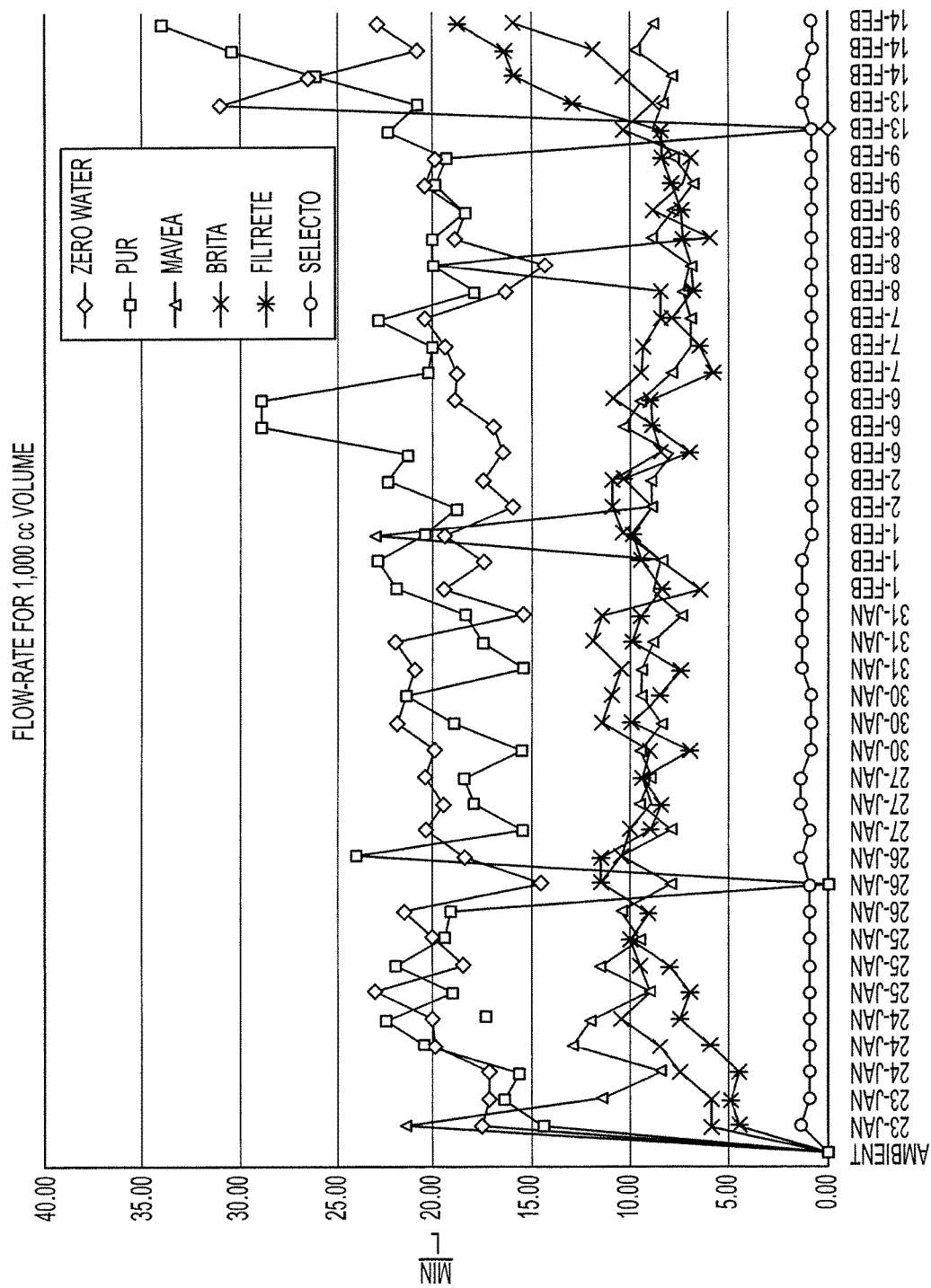
FIG. 1 is a graph showing the results of flowrate testing, in minutes/L, of various gravity water filters during processing of 1000 cc of water, over a period of time, including a purification system according to an embodiment disclosed herein.
Figure 2A:
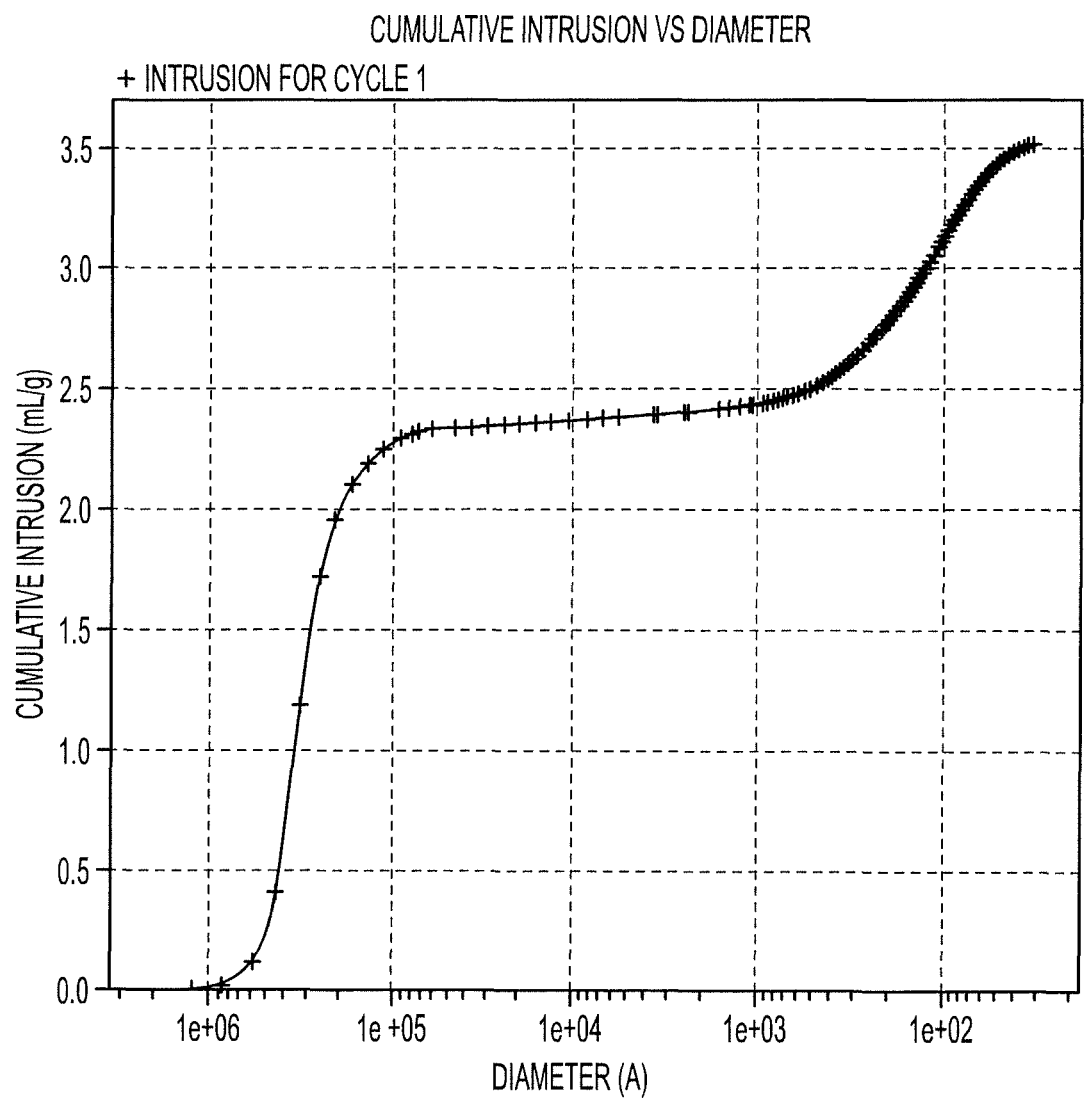
FIG. 2a shows cumulative intrusion vs. diameter.
Figure 2B:
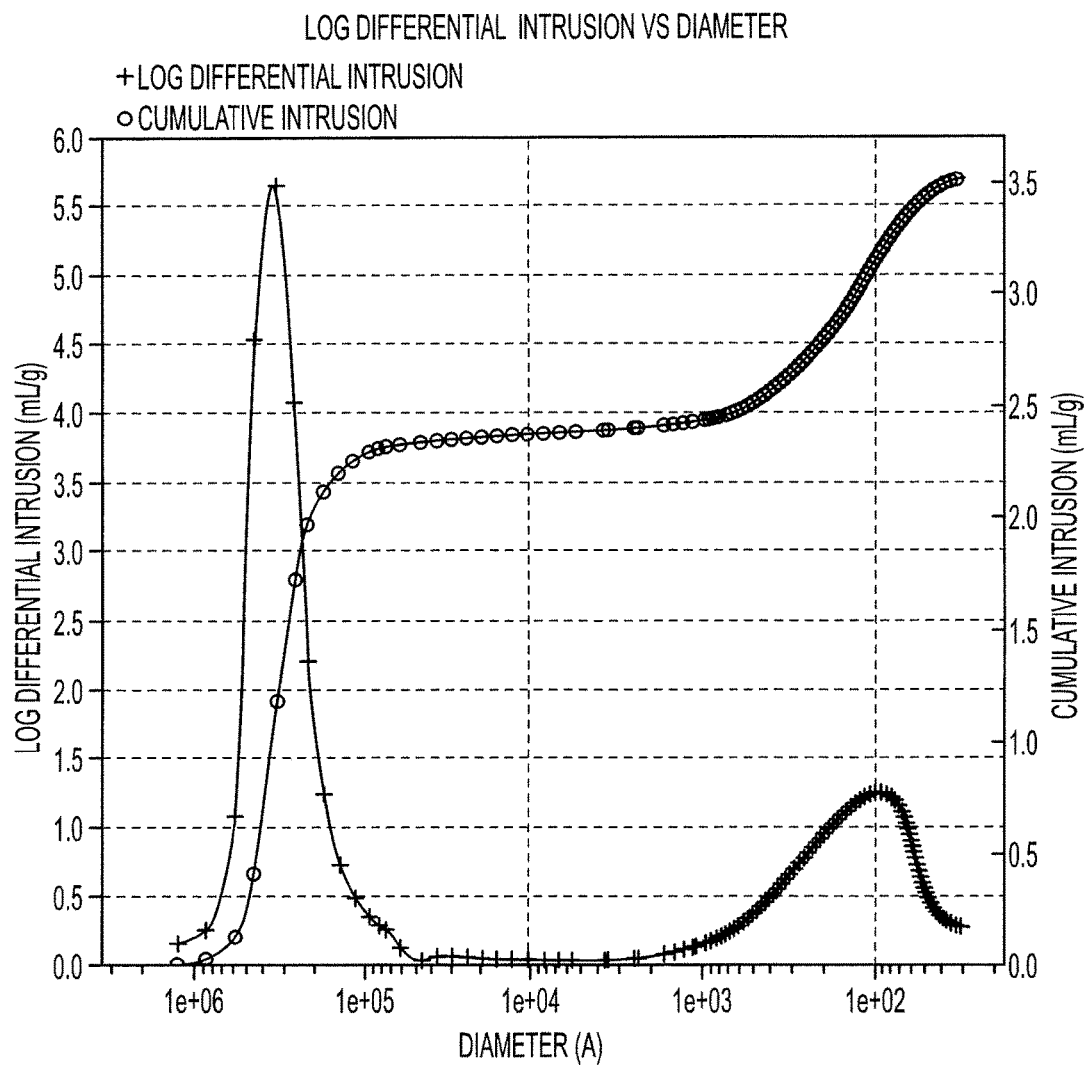
FIG. 2b shows log differential intrusion vs. diameter.
Figure 2C:
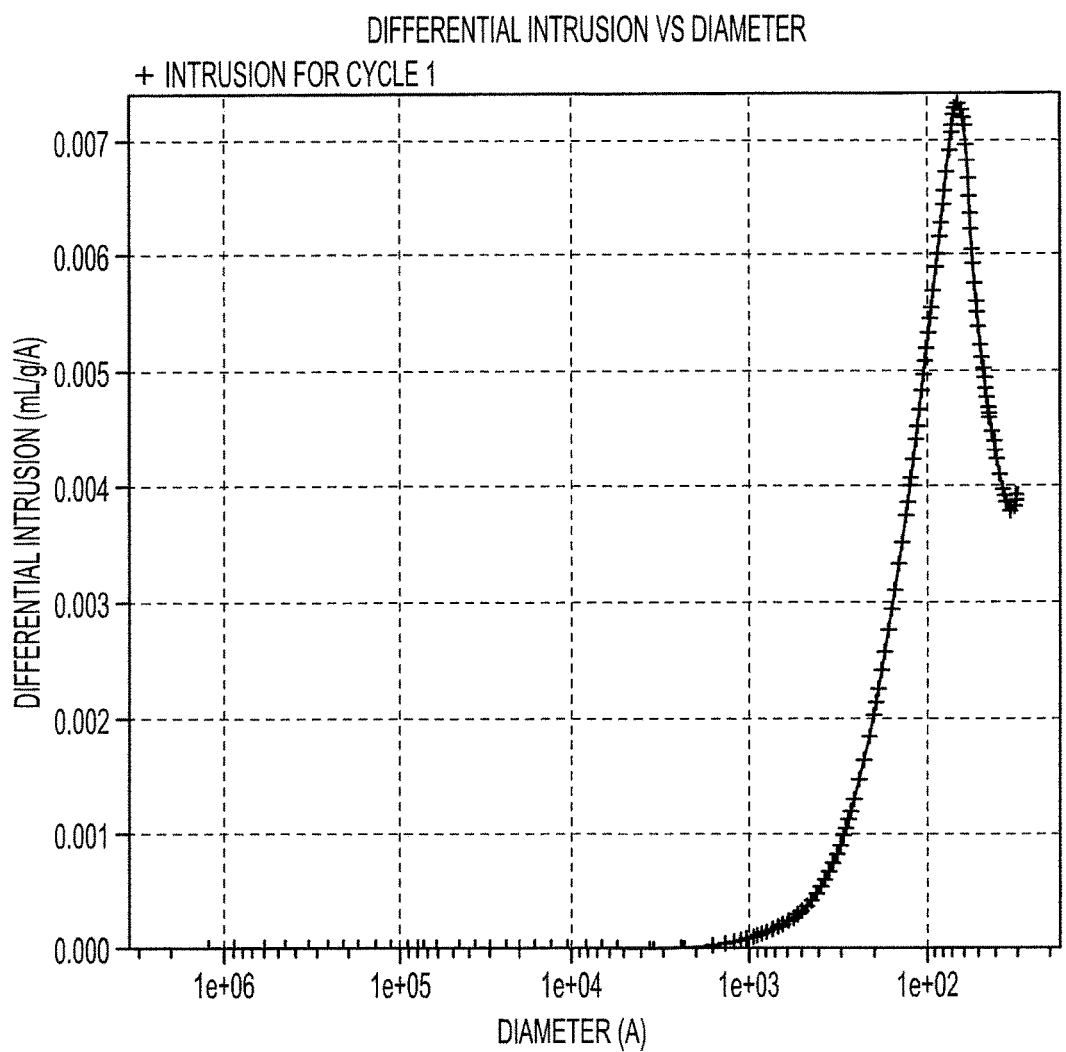
FIG. 2c shows differential intrusion vs. diameter.
Figure 2D:
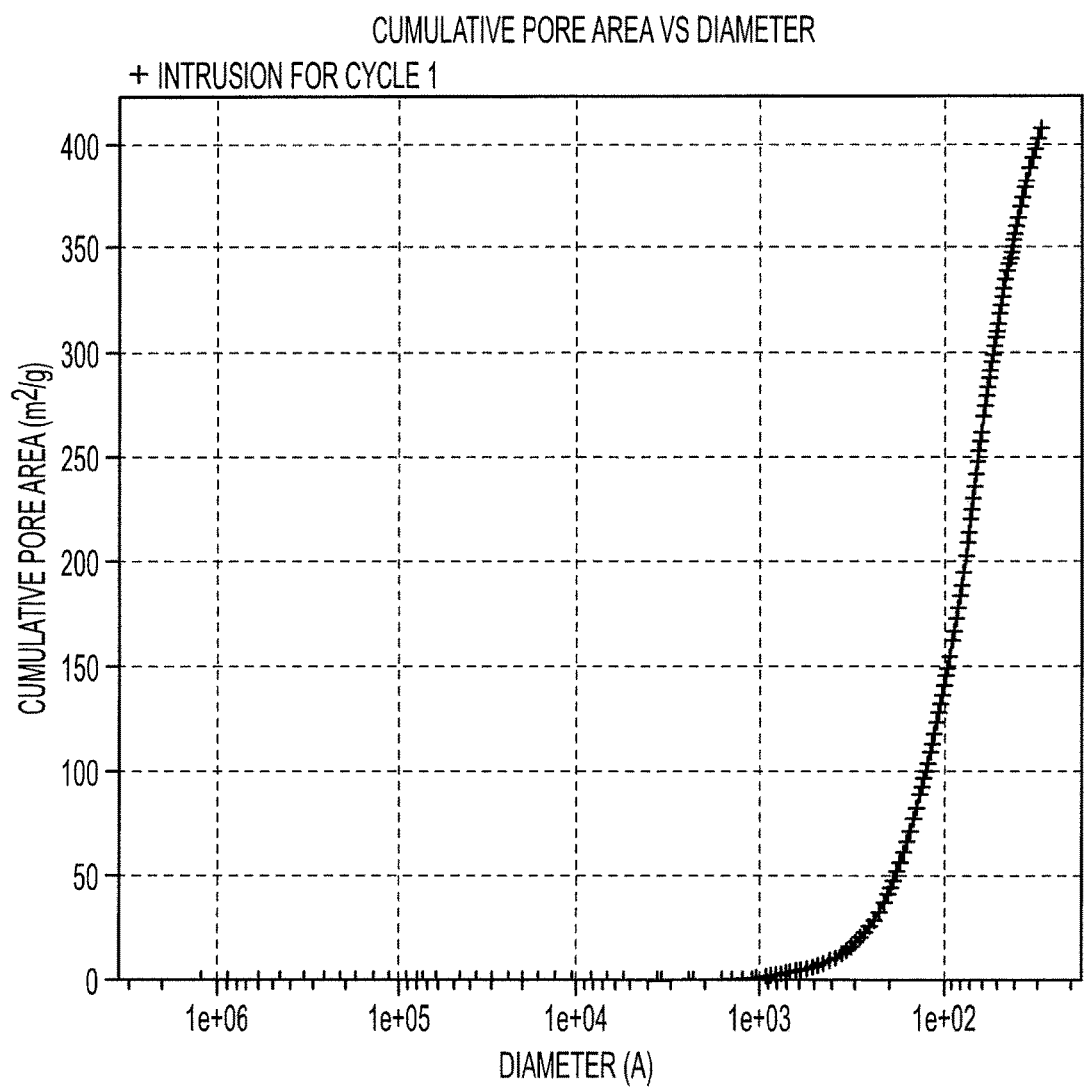
FIG. 2d shows cumulative pore area vs. diameter.
Figure 2E:
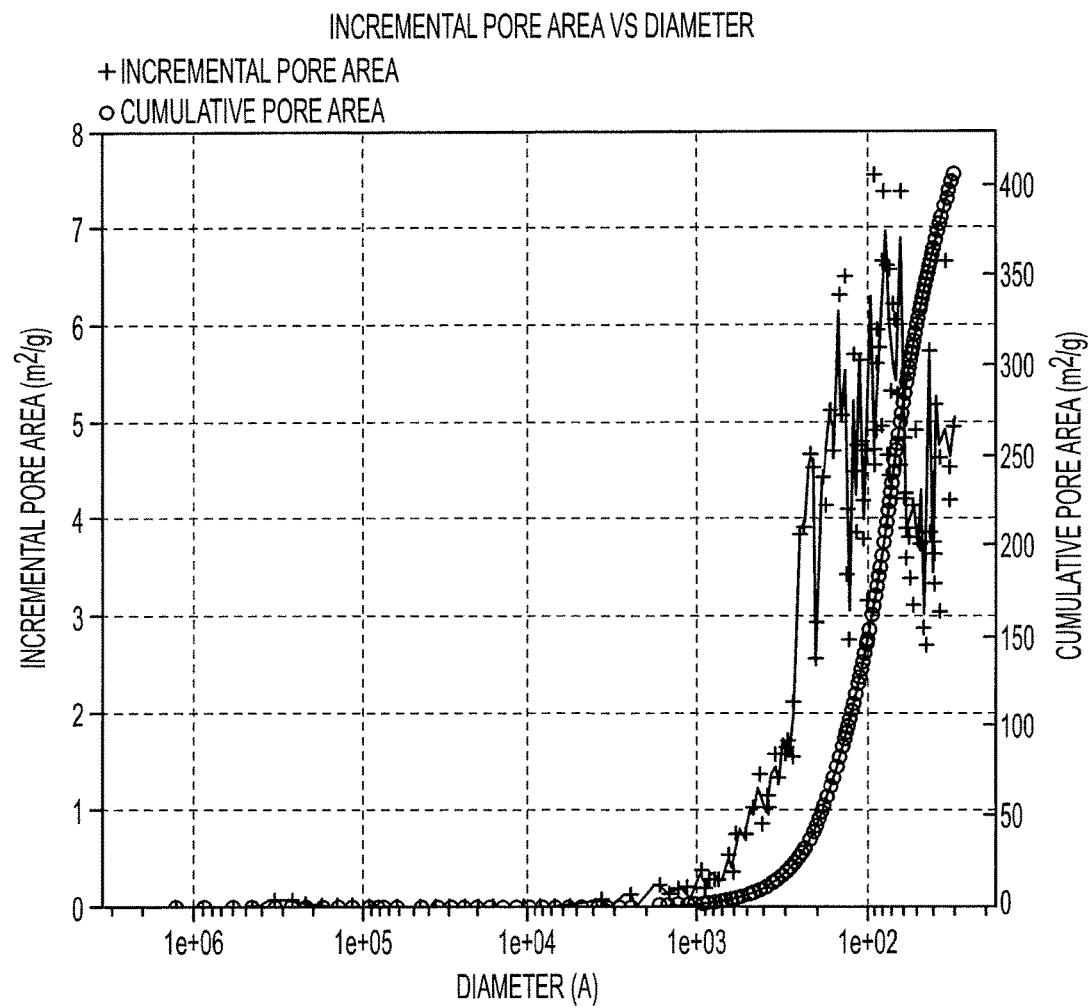
FIG. 2e shows incremental pore area vs. diameter.

In one embodiment, the purification material is in the form of a granular purification media formed into a flat layer, such as in the form of a disc, which is placed into a housing or other structure designed to retain the particles of the purification media within the structure, and containing openings allowing water to flow in and out of the structure. An example would be a plastic housing having openings therein, with a mesh of fibers or fabric or a metallic screen disposed on inner surfaces of the housing through which water can flow, but which retains particles of the purification media within the housing.

In a particular embodiment, the purification media used is a high porosity, low-ash or ash-free carbon having a pore volume of from about 0.80 to about 1.5, more particularly from 0.812 to 1.43, cc per gram of media, packed into a disc having a outer diameter of 2.5 inches and a thickness of 0.5 inch. The amount of purification media packed into the disc can vary, but is generally 10-20 grams, more particularly about 15 grams, in a disc of the dimensions noted above.

Because of the low ash content of the carbon, and because of its high purification kinetics, it can be fully packed into the volume of the disc, without a resulting decrease in volume of the bed of purification material under use, e.g., by loss of ash particles during use, or by the intentional reduction of material present in the housing to achieve acceptable flow rates. As a result, and by contrast to purification materials containing higher ash contents, the maintenance of volume of bed of purification material means that the particles of purification material do not move about within the housing during use, causing breakage of the particles, with a resulting extended period of fines emission into the purified water.

The purification material described herein, when formed into a disc-shaped layer of the dimensions described above, is able to process water at a flow rate of 1000-1500 cc per minute. Moreover, these flow rates are achievable with a pressure head of 300 cc above the layer of purification material. Chorine removal is 75% to 98% at the 1500 cc/minute flow rate, which provides a significant reduction in chorine taste/odor in typical chlorinated tap water. The purification system is capable of removing chlorine to at least this level for a capacity of about 30 to about 100 gallons of water per gram of purification media, more particularly for a capacity of about 33 to about 66 gallons of water per gram of purification media. The level of chlorine reduction is generally about 75% reduction, and complies with NSF Standard 42 with regard to chlorine taste and odor, and reduces the level of chlorine from, e.g., 2 ppm to 1 ppm.

The carbon used in the purification material is desirably a catalytic carbon, having an average particle size of approximately 20 to approximately 80 mesh, more particularly, approximately 28 to approximately 58 mesh, or more particularly approximately 30 to approximately 80 mesh. Desirably, the carbon has a mean particle size ranging from 700 to 900 μm with a standard deviation of 200 to 300 μm.

Figure 3:
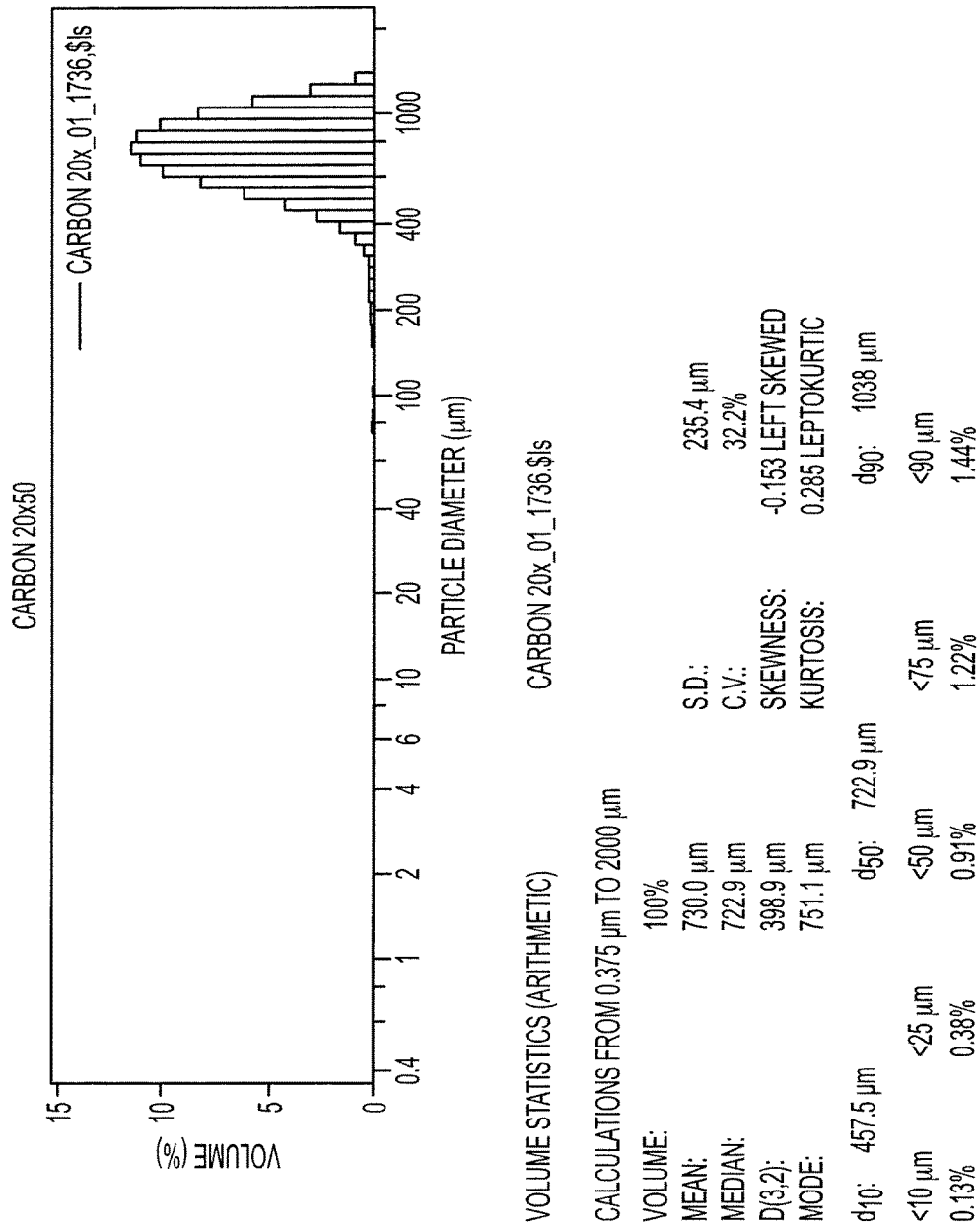
FIG. 3 is a graph showing the particle size distribution for an embodiment of purification media prepared as described herein and used in embodiments of purification system described herein, obtained using a Beckman Coulter LS Particle Size Analyzer.

A suitable carbon having a nominal size range from approximately 20 to approximately 50 mesh has a particle size distribution as shown in FIG. 3. In a particularly suitable carbon, the mean particle size is approximately 730 μm with a standard deviation of approximately 235 μm.

The carbon may be used, and desirably is used, without any binder, and is simply packed, e.g., by vibration into the housing. Suitable carbons include those having some or all of the carbon being a hollow core carbon.

For example, a particularly suitable catalytic carbon is obtained by using as a feedstock carbon RGC, available from MeadWestvaco. This feedstock is modified by washing with an aqueous solution of 40% phosphoric acid in an amount of 100 gallons of solution per 500 kg of carbon. Washing was continued using recycled solution for 60 minutes. The washed carbon was then heated to 700° C. in a mixture of ammonia gas and nitrogen for 21 hours, then cooled down for 24 hours.

The ammonia-treated acid-washed carbon was then washed with a solution containing 30 wt % of peroxide and zeolite-containing polymer (Peroxotitanium silicate PTS 6000, Selecto Inc.), and 4 wt % of a nanozinc or $TiO_2$ powder, and dried at 100° F. for 48 hours in a vacuum drier.

A suitable carbon prepared according to the above procedure had the pore size and volume characteristics shown in FIG. 2, and set forth in Table 1 below.

TABLE 1

Summary Report

| Penetrometer: | 389-(10) 5 Bulb, 1.131 Stem, Powder | | |
|---|---|---|---|
| Pen. Constant: | 21.630 μL/pF | Adv. Contact Angle: | 130.000 degrees |
| Pen. Weight: | 63.6931 g | Rec. Contact Angle: | 130.000 degrees |
| Stem Volume: | 1.1310 mL | Hg Surface Tension: | 485.000 dynes/cm |
| Max. Head Pressure: | 4.4500 psia | Hg Density: | 13.5335 g/mL |
| Pen. Volume: | 5.9250 mL | Sample Weight: | 0.3203 g |
| | | Assembly Weight: | 125.4047 g |

Low Pressure:

| | |
|---|---|
| Evacuation Pressure: | 50.000 μmHg |
| Evacuation Time: | 5 mins |
| Mercury Filling Pressure: | 1.46 psia |
| Equilibration Time: | 10 secs |

High Pressure:

| | |
|---|---|
| Equilibration Time: | 10 secs |
| No Blank Correction | |

Intrusion Data Summary

| | |
|---|---|
| Total Intrusion Volume = | 3.5100 mL/g |
| Total Pore Area = | 406.678 m²/g |
| Median Pore Diameter (Volume) = | 250806 A |
| Median Pore Diameter (Area) = | 77 A |
| Average Pore Diameter (4 V/A) = | 345 A |
| Bulk Density = | 0.2306 g/mL |
| Apparent (skeletal) Density = | 1.2110 g/mL |
| Porosity = | 80.9546% |
| Stem Volume Used = | 99% **** |

Tabular Report

| Mean Diameter (A) | Cumulative Pore Volume (mL/g) | Incremental Pore Volume (mL/g) | Cumulative Pore Area (m²/g) | Incremental Pore Area (m²/g) | % of Total Intrusion Volume |
|---|---|---|---|---|---|
| 1240882 | 0.0000 | 0.0000 | 0.000 | 0.000 | 0.0000 |
| 1049811 | 0.0242 | 0.0242 | 0.001 | 0.001 | 0.6891 |
| 719934 | 0.1248 | 0.1007 | 0.007 | 0.006 | 3.5569 |

TABLE 1-continued

| | | | | | |
|---|---|---|---|---|---|
| 510838 | 0.4092 | 0.2843 | 0.029 | 0.022 | 11.6570 |
| 382462 | 1.1856 | 0.7765 | 0.110 | 0.081 | 33.7787 |
| 289673 | 1.7237 | 0.5380 | 0.184 | 0.074 | 49.1074 |
| 233019 | 1.9650 | 0.2413 | 0.226 | 0.041 | 55.9814 |
| 191168 | 2.1124 | 0.1475 | 0.257 | 0.031 | 60.1834 |
| 154902 | 2.1966 | 0.0842 | 0.278 | 0.022 | 62.5817 |
| 125598 | 2.2482 | 0.0516 | 0.295 | 0.016 | 64.0511 |
| 101492 | 2.2870 | 0.0388 | 0.310 | 0.015 | 65.1556 |
| 84446 | 2.3059 | 0.0190 | 0.319 | 0.009 | 65.6961 |
| 75438 | 2.3159 | 0.0100 | 0.324 | 0.005 | 65.9798 |
| 66309 | 2.3345 | 0.0186 | 0.335 | 0.011 | 66.5102 |
| 52497 | 2.3380 | 0.0035 | 0.338 | 0.003 | 66.6085 |
| 40420 | 2.3445 | 0.0065 | 0.345 | 0.006 | 66.7950 |
| 32854 | 2.3514 | 0.0069 | 0.353 | 0.008 | 66.9917 |
| 26622 | 2.3576 | 0.0062 | 0.362 | 0.009 | 67.1681 |
| 21561 | 2.3621 | 0.0045 | 0.371 | 0.008 | 67.2970 |
| 17605 | 2.3661 | 0.0039 | 0.380 | 0.009 | 67.4089 |
| 14308 | 2.3699 | 0.0038 | 0.390 | 0.011 | 67.5174 |
| 11569 | 2.3740 | 0.0042 | 0.405 | 0.014 | 67.6361 |
| 9200 | 2.3777 | 0.0037 | 0.421 | 0.016 | 67.7412 |
| 7346 | 2.3812 | 0.0035 | 0.440 | 0.019 | 67.8396 |
| 6008 | 2.3845 | 0.0033 | 0.462 | 0.022 | 67.9345 |
| 4466 | 2.3943 | 0.0098 | 0.549 | 0.087 | 68.2126 |
| 3432 | 2.3948 | 0.0005 | 0.555 | 0.006 | 68.2262 |
| 2841 | 2.4043 | 0.0095 | 0.689 | 0.134 | 68.4975 |
| 2289 | 2.4049 | 0.0006 | 0.699 | 0.010 | 68.5145 |
| 1909 | 2.4161 | 0.0112 | 0.934 | 0.235 | 68.8333 |
| 1473 | 2.4212 | 0.0051 | 1.073 | 0.139 | 68.9791 |
| 1294 | 2.4275 | 0.0063 | 1.268 | 0.195 | 69.1588 |
| 1141 | 2.4336 | 0.0061 | 1.481 | 0.213 | 69.3318 |
| 1051 | 2.4358 | 0.0023 | 1.567 | 0.086 | 69.3962 |
| 966 | 2.4450 | 0.0092 | 1.946 | 0.379 | 69.6573 |
| 876 | 2.4494 | 0.0044 | 2.147 | 0.201 | 69.7828 |
| 819 | 2.4555 | 0.0061 | 2.444 | 0.296 | 69.9558 |
| 765 | 2.4611 | 0.0056 | 2.736 | 0.292 | 70.1152 |
| 722 | 2.4662 | 0.0051 | 3.020 | 0.284 | 70.2610 |
| 683 | 2.4724 | 0.0062 | 3.382 | 0.363 | 70.4374 |
| 639 | 2.4808 | 0.0085 | 3.912 | 0.529 | 70.6782 |
| 601 | 2.4865 | 0.0057 | 4.292 | 0.380 | 70.8410 |
| 565 | 2.4972 | 0.0107 | 5.051 | 0.759 | 71.1462 |
| 525 | 2.5071 | 0.0099 | 5.804 | 0.753 | 71.4277 |
| 489 | 2.5191 | 0.0120 | 6.788 | 0.984 | 71.7702 |
| 456 | 2.5307 | 0.0115 | 7.802 | 1.013 | 72.0991 |
| 425 | 2.5452 | 0.0145 | 9.168 | 1.367 | 72.5129 |
| 401 | 2.5539 | 0.0087 | 10.035 | 0.867 | 72.7605 |
| 383 | 2.5647 | 0.0108 | 11.167 | 1.132 | 73.0691 |
| 366 | 2.5738 | 0.0090 | 12.156 | 0.989 | 73.3268 |
| 349 | 2.5874 | 0.0136 | 13.711 | 1.555 | 73.7134 |
| 332 | 2.5987 | 0.0113 | 15.073 | 1.362 | 74.0356 |
| 319 | 2.6093 | 0.0106 | 16.402 | 1.330 | 74.3375 |
| 306 | 2.6218 | 0.0125 | 18.037 | 1.635 | 74.6936 |
| 293 | 2.6333 | 0.0115 | 19.611 | 1.574 | 75.0225 |
| 282 | 2.6453 | 0.0120 | 21.315 | 1.704 | 75.3651 |
| 272 | 2.6558 | 0.0105 | 22.854 | 1.539 | 75.6635 |
| 262 | 2.6696 | 0.0138 | 24.959 | 2.105 | 76.0569 |
| 248 | 2.6934 | 0.0238 | 28.796 | 3.837 | 76.7352 |
| 232 | 2.7162 | 0.0227 | 32.711 | 3.915 | 77.3829 |
| 218 | 2.7416 | 0.0255 | 37.391 | 4.680 | 78.1087 |
| 204 | 2.7650 | 0.0233 | 41.955 | 4.564 | 78.7734 |
| 195 | 2.7776 | 0.0126 | 44.537 | 2.582 | 79.1329 |
| 189 | 2.7915 | 0.0139 | 47.479 | 2.942 | 79.5297 |
| 182 | 2.8116 | 0.0201 | 51.900 | 4.421 | 80.1028 |
| 174 | 2.8297 | 0.0181 | 56.054 | 4.155 | 80.6183 |
| 167 | 2.8505 | 0.0208 | 61.050 | 4.996 | 81.2118 |
| 159 | 2.8710 | 0.0205 | 66.189 | 5.139 | 81.7951 |
| 153 | 2.8890 | 0.0180 | 70.892 | 4.703 | 82.3072 |
| 146 | 2.9121 | 0.0231 | 77.202 | 6.309 | 82.9651 |
| 140 | 2.9299 | 0.0179 | 82.293 | 5.091 | 83.4738 |
| 135 | 2.9519 | 0.0219 | 88.796 | 6.503 | 84.0978 |
| 130 | 2.9630 | 0.0112 | 92.230 | 3.434 | 84.4166 |
| 127 | 2.9760 | 0.0130 | 96.307 | 4.077 | 84.7863 |
| 125 | 2.9846 | 0.0086 | 99.057 | 2.750 | 85.0305 |
| 122 | 2.9983 | 0.0137 | 103.543 | 4.486 | 85.4205 |
| 118 | 3.0152 | 0.0169 | 109.249 | 5.706 | 85.9020 |
| 115 | 3.0262 | 0.0111 | 113.088 | 3.839 | 86.2174 |
| 113 | 3.0397 | 0.0135 | 117.860 | 4.772 | 86.6007 |
| 110 | 3.0552 | 0.0155 | 123.503 | 5.643 | 87.0415 |
| 107 | 3.0680 | 0.0129 | 128.319 | 4.815 | 87.4078 |

TABLE 1-continued

| | | | | |
|---|---|---|---|---|
| 105 | 3.0779 | 0.0099 | 132.098 | 3.779 | 87.6893 |
| 103 | 3.0886 | 0.0107 | 136.275 | 4.177 | 87.9945 |
| 100 | 3.1004 | 0.0118 | 140.966 | 4.691 | 88.3303 |
| 98 | 3.1121 | 0.0117 | 145.710 | 4.744 | 88.6626 |
| 97 | 3.1197 | 0.0076 | 148.862 | 3.153 | 88.8797 |
| 95 | 3.1330 | 0.0133 | 154.486 | 5.624 | 89.2595 |
| 92 | 3.1504 | 0.0174 | 162.031 | 7.544 | 89.7546 |
| 90 | 3.1606 | 0.0102 | 166.589 | 4.559 | 90.0463 |
| 88 | 3.1737 | 0.0131 | 172.546 | 5.957 | 90.4194 |
| 86 | 3.1843 | 0.0106 | 177.472 | 4.926 | 90.7212 |
| 84 | 3.1965 | 0.0121 | 183.235 | 5.763 | 91.0671 |
| 83 | 3.2067 | 0.0102 | 188.193 | 4.958 | 91.3588 |
| 81 | 3.2202 | 0.0135 | 194.851 | 6.658 | 91.7420 |
| 79 | 3.2347 | 0.0145 | 202.228 | 7.377 | 92.1557 |
| 77 | 3.2474 | 0.0127 | 208.862 | 6.634 | 92.5186 |
| 75 | 3.2562 | 0.0088 | 213.540 | 4.678 | 92.7696 |
| 74 | 3.2684 | 0.0121 | 220.111 | 6.570 | 93.1155 |
| 73 | 3.2765 | 0.0081 | 224.572 | 4.461 | 93.3461 |
| 71 | 3.2860 | 0.0095 | 229.904 | 5.332 | 93.6174 |
| 70 | 3.2954 | 0.0094 | 235.260 | 5.356 | 93.8854 |
| 69 | 3.3061 | 0.0107 | 241.476 | 6.215 | 94.1906 |
| 68 | 3.3163 | 0.0102 | 247.532 | 6.057 | 94.4822 |
| 66 | 3.3252 | 0.0088 | 252.838 | 5.306 | 94.7332 |
| 65 | 3.3327 | 0.0075 | 257.425 | 4.587 | 94.9469 |
| 64 | 3.3397 | 0.0070 | 261.780 | 4.356 | 95.1469 |
| 63 | 3.3513 | 0.0117 | 269.160 | 7.380 | 95.4793 |
| 62 | 3.3588 | 0.0075 | 274.008 | 4.847 | 95.6929 |
| 61 | 3.3665 | 0.0076 | 279.020 | 5.012 | 95.9100 |
| 60 | 3.3728 | 0.0063 | 283.243 | 4.224 | 96.0897 |
| 59 | 3.3785 | 0.0057 | 287.129 | 3.885 | 96.2525 |
| 58 | 3.3837 | 0.0052 | 290.744 | 3.615 | 96.4017 |
| 57 | 3.3898 | 0.0061 | 295.002 | 4.259 | 96.5747 |
| 56 | 3.3946 | 0.0048 | 298.396 | 3.394 | 96.7104 |
| 55 | 3.3998 | 0.0052 | 302.188 | 3.792 | 96.8596 |
| 54 | 3.4054 | 0.0056 | 306.313 | 4.125 | 97.0190 |
| 53 | 3.4096 | 0.0042 | 309.435 | 3.122 | 97.1377 |
| 53 | 3.4146 | 0.0050 | 313.240 | 3.805 | 97.2801 |
| 51 | 3.4209 | 0.0063 | 318.148 | 4.908 | 97.4599 |
| 50 | 3.4259 | 0.0050 | 322.125 | 3.977 | 97.6023 |
| 49 | 3.4306 | 0.0048 | 325.987 | 3.862 | 97.7380 |
| 48 | 3.4351 | 0.0045 | 329.726 | 3.738 | 97.8668 |
| 47 | 3.4401 | 0.0050 | 333.941 | 4.215 | 98.0093 |
| 46 | 3.4444 | 0.0043 | 337.628 | 3.687 | 98.1314 |
| 46 | 3.4488 | 0.0044 | 341.492 | 3.864 | 98.2568 |
| 45 | 3.4520 | 0.0032 | 344.360 | 2.868 | 98.3484 |
| 44 | 3.4550 | 0.0030 | 347.049 | 2.689 | 98.4332 |
| 43 | 3.4612 | 0.0062 | 352.775 | 5.726 | 98.6095 |
| 42 | 3.4651 | 0.0039 | 356.513 | 3.738 | 98.7214 |
| 41 | 3.4686 | 0.0035 | 359.861 | 3.348 | 98.8198 |
| 40 | 3.4723 | 0.0037 | 363.506 | 3.645 | 98.9249 |
| 39 | 3.4774 | 0.0051 | 368.698 | 5.192 | 99.0708 |
| 38 | 3.4822 | 0.0048 | 373.689 | 4.992 | 99.2064 |
| 37 | 3.4864 | 0.0043 | 378.322 | 4.632 | 99.3285 |
| 36 | 3.4892 | 0.0027 | 381.347 | 3.025 | 99.4065 |
| 35 | 3.4950 | 0.0058 | 388.011 | 6.664 | 99.5727 |
| 34 | 3.4988 | 0.0038 | 392.543 | 4.533 | 99.6812 |
| 33 | 3.5023 | 0.0035 | 396.763 | 4.220 | 99.7796 |
| 32 | 3.5062 | 0.0039 | 401.714 | 4.951 | 99.8915 |
| 31 | 3.5100 | 0.0038 | 406.678 | 4.963 | 100.0000 |

Example 1

The purification material described herein was prepared and tested in comparison to other, more conventional purification materials. Each was formed into a disc having an outer diameter of 2.5 inch and a thickness of 0.5 inch. Each of the purification materials has a size distribution of about 28 mesh to about 58 mesh. Each was packed with 15 grams of purification media indicated below, to 100% of the disc volume, and were tested for flow rates (using a 350 cc pressure head of water) and fines emissions (using NTU measurement and laser counting). The catalyst carbon was prepared as described above. The results are presented in Table 2 below.

TABLE 2

| Purification Material | Flow Rate | Liters processed before fine emission ceases |
|---|---|---|
| Coconut shell carbon (Calgon), 60 Å | 50 cc/min | 5 |
| Coal based carbon (Calgon), 60 Å | 39 cc/min | 10 |
| Coconut shell carbon (Pica), 80 Å | 0 cc/min, after 60 min | 6 |
| Catalyst carbon purification material (Selecto), 20,000 Å | 1500 cc/min | 0 |

In addition, the purification material disclosed herein did not significantly change its flow characteristics even after sorbing contaminants from water having total organic contaminants of 10 ppm, indicating that swelling due to organic contaminants in the water did not restrict flow.

Example 2

The purification system described in Example 1 was tested along with various commercially available gravity water filters to assess how the flow rate changed over time. Each system was subjected to a flow of 1000 cc of water three times per day for each day of the test, and the flow rate measured. As can be seen in FIG. 1, the flow rate for the Selecto system, which is the system of Example 1, was much faster than any of the commercially available filter systems, and remained very steady and consistent over the time period of the testing. Flow rates for the other filters, by contrast, remained high but varied significantly from one day to the next. While not wishing to be bound by any theory, it is believed that this variation in the commercially available filters may have resulted, at least in part, from swelling of the purification media due to exposure to contaminants in the water, such as dissolved or suspended organic materials, which do not have much of an effect on the presently disclosed system.

The purification system disclosed herein has sufficiently high purification kinetics that only a short residence time is necessary to remove chlorine and other contaminates from water. This means that a relatively thin layer of media can be used, which contributes to a rapid flow rate of water through the purification system. Such rapid purification is commercially desirable by consumers, leading to increased use of the product, and the production of more purified water.

For example, the purification system disclosed herein can reduce benzene levels to those satisfying NSF test procedure 53 at a flow rate of 1500 cc/min using only 12 g of purification media.

What is claimed is:

1. A gravity fed purification system comprising:
a purification media comprising a layer, the layer containing 10-20 g of purification material of low ash catalytic carbon comprising an acid-washed carbon that has been heat-treated and washed with a solution containing peroxide, peroxotitanium silicate, and nanozinc or $TiO_2$ powder, and the low ash catalytic carbon having a nominal particle size range of about 20 mesh to about 50 mesh;
wherein the low ash catalytic carbon has a total pore volume ranging from about 0.80 to about 1.5 cc/g; and
wherein the purification system is able to produce a flow rate of about 1000 to about 1500 cc/min with a volume of about 300 to about 350 cc of water to remove 75% to 98% of Chlorine from the water.

2. The purification system according to claim 1, wherein the system reduces the level of chlorine in chlorinated tap water with a capacity of 30-100 gallons of water per gram of purification media.

3. The purification system according to claim 1, wherein the low ash catalytic carbon has a mean particle size ranging from 700 to 900 μm with a standard deviation of 200 to 300 μm.

4. The purification system according to claim 1, wherein the low ash catalytic carbon has a mean particle size of approximately 730 μm with a standard deviation of approximately 235 μm.

5. The purification system according to claim 2, wherein the level of chlorine in water passing through the purification system is reduced by 75%.

6. The purification system according to claim 1, wherein the system reduces the level of benzene in water passing through the purification system to a level that is in accordance with NSF test procedure 53 at a flow rate of 1500 cc/min using 12 g of purification media.

* * * * *